(12) United States Patent
Przytula

(10) Patent No.: US 7,328,200 B2
(45) Date of Patent: Feb. 5, 2008

(54) APPARATUS, METHOD, AND COMPUTER PROGRAM PRODUCT FOR CONVERTING DECISION FLOWCHARTS INTO DECISION PROBABILISTIC GRAPHS

(75) Inventor: Krzysztof W. Przytula, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 399 days.

(21) Appl. No.: 10/695,529

(22) Filed: Oct. 27, 2003

(65) Prior Publication Data

US 2005/0091177 A1 Apr. 28, 2005

(51) Int. Cl.
*G06N 5/00* (2006.01)

(52) U.S. Cl. .......................................... 706/52; 706/20

(58) Field of Classification Search ................. 706/52, 706/45, 47, 20
See application file for complete search history.

(56) References Cited

U.S. PATENT DOCUMENTS

| | | | |
|---|---|---|---|
| 6,336,108 B1 * | 1/2002 | Thiesson et al. | 706/20 |
| 6,345,265 B1 * | 2/2002 | Thiesson et al. | 706/52 |
| 6,408,290 B1 * | 6/2002 | Thiesson et al. | 706/52 |

OTHER PUBLICATIONS

Penaloza, R, Improvements on KAMET-to-Bayesian-Network Transformations, Instituto Tecnologico Autonomo de Mexico (ITAM), Department of Computer Science, 2003, pp. 1-10.*

Cairo, O, Using Bayesian Networks as an Inference Engine in KAMET, Proceedings of the XXIII International Conference of the Chilean Computer Science Society (SCCC'03), 2003, pp. 1-7.*

* cited by examiner

*Primary Examiner*—Wilbert L Starks, Jr.
(74) *Attorney, Agent, or Firm*—Tope-McKay & Assoc.

(57) ABSTRACT

The present invention converts decision flowcharts into decision probabilistic graphs on a data processing system. First, a decision flowchart is received, having evidence nodes, a root evidence node, and outcome nodes. The outcome nodes are related to the evidence nodes by conclusion links. Next, an operation is performed, generating a probabilistic graph based on the flowchart. The graph includes an aggregate outcome node having outcome states, with each outcome state representing an outcome node of the flowchart; a plurality of test nodes, each matching an evidence node in the flowchart, and each test state matching a conclusion link from the evidence node in the flowchart, and causal links between the aggregate outcome node and the evidence nodes. Prior probabilities are calculated for outcome states based on predetermined likelihoods. Conditional probabilities are determined for test states by examining dependencies of conclusion links on the outcome nodes in the decision flowchart.

66 Claims, 7 Drawing Sheets

|        | F1 – defect | F3 – defect | F4 – defect | F5 – defect | OK – no defect |
|--------|-------------|-------------|-------------|-------------|----------------|
| T1 – test | pass     | fail        | fail        | fail        | pass           |
| T2 – test | fail     | -           | -           | -           | pass           |
| T3 – test | -        | fail        | pass        | pass        | -              |
| T4 – test | -        | -           | pass        | fail        | -              |

FIG. 6

|  | F1 – defect | F3 – defect | F4 – defect | F5 – defect | OK – no defect |
|---|---|---|---|---|---|
| T3 – fail | 0.5 | 1 | 0 | 0 | 0.5 |
| T3 – pass | 0.5 | 0 | 1 | 1 | 0.5 |

FIG. 7

APPARATUS, METHOD, AND COMPUTER PROGRAM PRODUCT FOR CONVERTING DECISION FLOWCHARTS INTO DECISION PROBABILISTIC GRAPHS

BACKGROUND (1) Technical Field

The present invention relates to the construction of decision probabilistic models, and their derivation, and more particularly to a tool for converting decision flowcharts into decision probabilistic models.

(2) Discussion

Most of the decision systems used in practice are based on decision flowcharts or databases of decision cases. These techniques have many shortcomings when compared with probabilistic graphical models, which are generally advocated for advanced decisions. They are much less accurate, less flexible, harder to maintain, and their complexity grows exponentially with the size of a diagnosed system. However, conventional decision flowcharts exist for many systems, and experts typically capture decision knowledge in the form of flowcharts.

Conventional decision flowcharts are very popular tools with severe decision limitations and high creation and modification costs. Despite the fact that decision flowcharts are the most common graphical form for expressing decision procedures, their design is time-consuming and requires extensive expertise in diagnosing a system for which it is intended. Such flowcharts consist of ordered observations (e.g., symptoms, error messages, and tests) and failures. The user follows a fixed sequence of observations and arrives at the root-cause failure. The procedure does not allow the user to divert from the prescribed sequence of observations. Creating the flow charts is a time-consuming process requiring advance decision expertise. Once created, the flowcharts are difficult to modify and maintain, with the result that eliminating or adding observations or failures to the flowchart often requires a complete redesign. Therefore, in practice, the flowchart-based decision tools rapidly become out-of-date.

Graphical probabilistic models are decision models of decisions and observations. Expert knowledge or decision data is used to create the graphical probabilistic model. The model captures causal dependencies between the decisions and the observations. They can produce dynamic decision procedures, when used with algorithmic engines. At each step of the decision sequence, the user has full flexibility in choosing the next observation to perform.

Decision flowcharts for diagnostic applications diagnose only single-defect failures. Their design assumes that one and only one component failed; and therefore, a single deterministic sequence of tests will lead to the proper conclusion, indicating which component is the root-cause of the failure. When the flowchart is used in diagnosis, the user has to adhere strictly to the sequence of observations prescribed in it. The flowchart has to be abandoned as a decision tool if, at some point at the observation sequence, the user is not able to perform the specified observation.

Graphical probabilistic models are a much more powerful form of expressing decision knowledge. They are much more flexible and useful than flowcharts and are much easier to modify. One can explicitly express effectiveness and cost of observation information in them. During diagnosis, an algorithmic engine uses a probabilistic model to produce ranked failures and ranked observations each time a new observation is made. The engine dynamically generates a sequence of observations, which are optimized for convergence to root-cause and for cost. The user has full flexibility in choosing which of the ranked observations to perform at each stage of the diagnosis.

Currently, there exists a need for a tool that automatically converts an existing flowchart into a graphical probabilistic model. Such a tool is particularly desirable in order to create powerful graphical probabilistic models in order to produce better decision procedures. A further advantage of such a conversion tool is that it would enable a user to take advantage of the flexibility of use and ease of modification that is possible with graphical models and impossible with conventional decision flowcharts.

SUMMARY

The present invention provides a method, a computer program product, and an apparatus for converting decision flowcharts into decision probabilistic graphs on a data processing system. The method comprises a set of steps to be performed on a data processing system, the computer program product comprises a set of computer operations encoded on a computer-readable medium, and the apparatus comprises a computer system including a processor, a memory coupled with the processor, an input coupled with the processor for receiving user input and data input, and an output coupled with the processor for outputting display data.

The operations performed by the invention, in a first aspect, include receiving a representation of a decision flowchart having evidence nodes, a root evidence node, and outcome nodes. The outcome nodes are related to the evidence nodes by conclusion links. A further operation of generating a probabilistic graph based on the decision flowchart is performed. The probabilistic graph generated includes an aggregate outcome node having a plurality of outcome states, with each outcome state representing an outcome node of the decision flowchart, and a plurality of test nodes with each of the test nodes matching an evidence node in the decision flowchart, and each test state matching a conclusion link from the evidence node in the flowchart. Causal links are created between the aggregate outcome node and the evidence nodes. Two additional operations in this aspect include calculating a set of prior probabilities for the outcome states based on predetermined likelihoods; and determining conditional probabilities for all test states by examining dependencies of conclusion links on the outcome nodes in the decision flowchart.

In a further aspect of the invention, a representation of the decision flowchart is obtained as a Flowchart Markup Language (FCML) document containing the essence of the decision flowchart.

In a still further aspect, the graphical representation of the decision flowchart is a Bayesian Network (BN).

In another aspect, in the operation of calculating a set of prior probabilities, an operation of generating a causal dependency table comprising a causal dependency of each test node on each outcome state is performed.

In yet another aspect, the causal dependency table includes a separate column for each outcome node of the decision flowchart and a separate row for each evidence node of the decision flowchart; whereby aggregate entries of each column of the table traces a path from the root evidence node to a particular outcome node.

In still another aspect, the operation of determining conditional probabilities further comprises an operation of generating, for each evidence node, a conditional probability table comprising the conditional probability of each test state given each outcome state.

In another aspect, the invention includes an operation of outputting a model file for the probabilistic graph to an algorithmic engine for further processing.

In a further aspect of the present invention, predetermined likelihoods are inputted based on observed statistics.

In a still further aspect, the present invention comprises a further operation of determining a next piece of evidence to gather based on cost-of-evidence data.

In yet another aspect, the present invention comprises an operation of generating a representation of the decision flowchart via graphing software for receipt in the receiving step.

In another aspect, the present invention comprises an operation of generating a user interface to accept user input to the algorithmic engine whereby the user can control the order in which evidence is collected.

In a further aspect, the present invention comprises an operation of converting the graphical representation of the decision flowchart into a Bayesian network modeling program-specific file.

BRIEF DESCRIPTION OF THE DRAWINGS

The objects, features and advantages of the present invention will be apparent from the following detailed descriptions of the preferred aspect of the invention in conjunction with reference to the following drawings where.

DETAILED DESCRIPTION

The present invention relates to the construction of decision probabilistic models, and their derivation, and more particularly to a tool for converting decision flowcharts into decision probabilistic models. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In order to provide a working frame of reference, first a glossary of some of the terms used in the description and claims is given as a central resource for the reader. The glossary is intended to provide the reader with a general understanding of various terms as they are used in this disclosure, but is not intended to limit the scope of these terms. Rather, the scope of the terms is intended to be construed with reference to this disclosure as a whole and with respect to the claims below. In particular, because there exists a degree of vocabulary "cross-over" between the language used to describe decision flowcharts and that used to describe probabilistic graphs, this glossary serves as an aid to the reader for distinguishing between those terms used to describe flowcharts and those used to describe probabilistic graphs. Then, a brief introduction is provided in the form of a narrative description of the present invention to give a conceptual understanding prior to developing the specific details.

(1) Glossary

Before describing the specific details of the present invention, it is useful to provide a centralized location for various terms used herein and in the claims. The terms defined are as follows:

Aggregate Outcome Node—An aggregate outcome node is a node of a probabilistic graph that includes outcome states, and that is linked with test nodes. An aggregate outcome node is an aggregation of the outcome nodes of a decision flowchart.

Conclusion Link—A conclusion link is an element of a decision flowchart representing a conclusion to be drawn from a set of evidence queries or tests. In the flowchart, the conclusions are represented as links between evidence nodes and other evidence nodes or between evidence nodes and outcome nodes.

Decision Flowchart—A decision flowchart is a general term used to indicate a tree-type diagram having a root evidence node and other evidence nodes, with evidence conclusion links extending from the evidence nodes to other evidence nodes or outcome nodes (leaf nodes in the flowchart), creating branches of the tree diagram. In an example of a decision flowchart, the root evidence node could be a diagnostic test, which is performed to gather information useful in making a decision. Given the evidence gathered from the diagnostic test, an evidence conclusion is made, represented by a conclusion link, and indicating a next diagnostic test to perform. After all diagnostic tests along a branch are performed a final conclusion is drawn, represented in the decision flowchart by an outcome node.

Evidence Nodes—Evidence nodes are elements of a decision flowchart, and represent gathered evidence, whether collected through the performance of a test, from existing information, or other mechanisms.

Test States—Test states are elements of a probabilistic graph, representing the conclusion links of an evidence node from a decision flowchart. They are included as elements of corresponding test nodes in the probabilistic graph. For example, if the evidence node represented a test, the evidence state could be either "pass" or "fail." Depending on the nature of the evidence nodes, there may be two or more possible associated test states (conclusions) for each evidence node.

Means—The term "means" as used with respect to this invention generally indicates a set of operations to be performed on a computer. Non-limiting examples of "means" include computer program code (source or object code) and "hard-coded" electronics. The "means" may be stored in the memory of a computer or on a computer readable medium.

Outcome Nodes—An outcome node is an element of a decision flowchart representing an outcome of, or a conclusion to be drawn from, a set of evidence queries or tests. In the flowchart, the outcome nodes are represented as leaf nodes in a tree structure.

Outcome States—Outcome states are elements of an aggregate outcome node of a probabilistic graph, with each outcome state representing an outcome node of a decision flowchart.

Probabilistic Graph—A probabilistic graph is a data structure comprising an aggregate outcome node that is directly linked with test nodes. The probabilistic graph is an alternative representation of the decision flowchart.

Test Node—A test node is an element of a probabilistic graph, linked with the aggregate outcome node. Test nodes include test states (e.g., "pass" or "fail" in a binary state case). It is important to note that the term "test" used in this context may be an active test, or it may be a passive decision mechanism. Because the test node contains aspects of the evidence nodes and the evidence conclusions of a probabilistic flowchart, the term "test" was selected simply as a convention for more clearly distinguishing what is intended, and not to imply any particular meaning.

(2) Introduction

Figure 1:
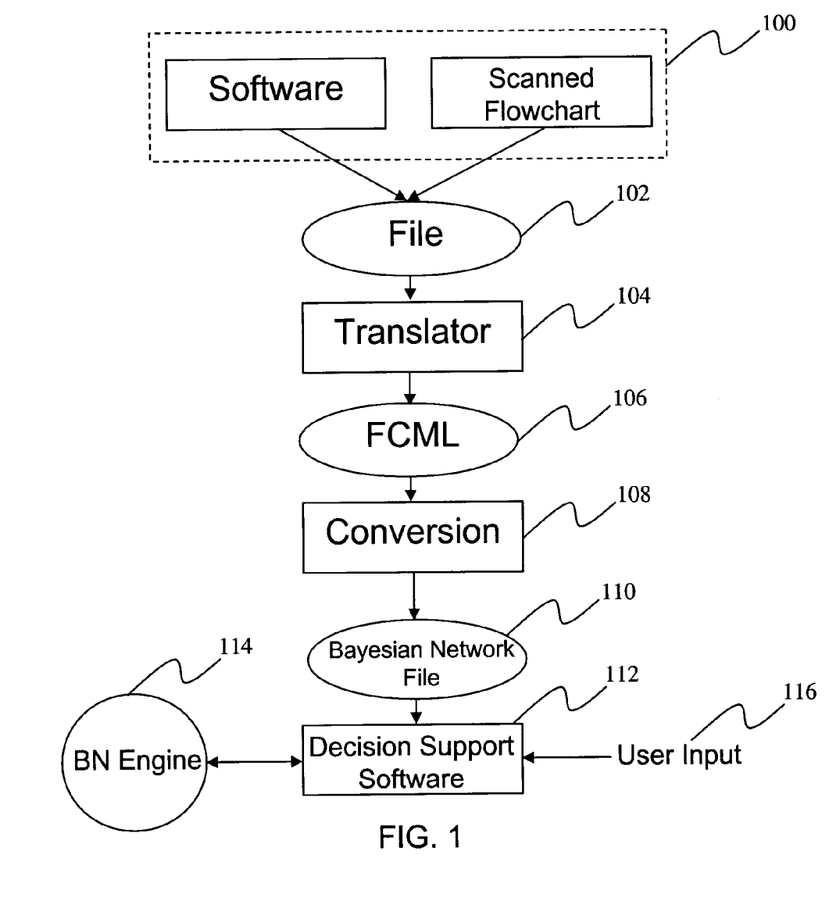
FIG. 1 is a block diagram illustrating the context within which the present invention may be used.

The present invention provides a mechanism for converting decision flowcharts into probabilistic graphs. The invention can form part of an overall decision modeling system. As shown in FIG. 1, such an overall system begins with a means for providing a model of a decision process in the form of a decision flowchart 100. This "means" can, for example, take the form of a software flowcharting system, a computer-aided drawing system, or a mechanism for computer-reading manually-designed flowcharts. After a flowchart is created, it is exported to a computer file 102. The computer file 102 may be in a format native to the program from which it was created, a "portable" format, or any other computer representation. After the computer file 102 has been created, it is provided to a translator 104. After translation, the file may be converted to portable file type 106 using an approach such as an extensible markup language (XML)-based language, termed a flow-chart markup language (FCML). The portable file is next converted by a converter 108 into a Bayesian network file 110. The operations of the present invention, in converting the decision flowchart into the probabilistic graph, form the heart of the converter 108. After conversion to a Bayesian network file 110, the file can be used in conjunction with decision support software 112 and a Bayesian network modeling program (engine) 114. The decision support software 112 and Bayesian network modeling program 114 allow the decision process embedded in the original decision flowchart to be manipulated and executed by user input 116.

The specific details regarding the conversion of the decision flowchart into the probabilistic graph form the heart of the present invention, and are explained below.

(3) Physical Aspects of the Present Invention

The present invention has three principal "physical" aspects. The first is an apparatus for converting decision flowcharts into decision probabilistic graphs, typically in the form of a computer system operating software or in the form of a "hard-coded" instruction set. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks and flash-type memories. These aspects will be described in more detail below.

Figure 2:
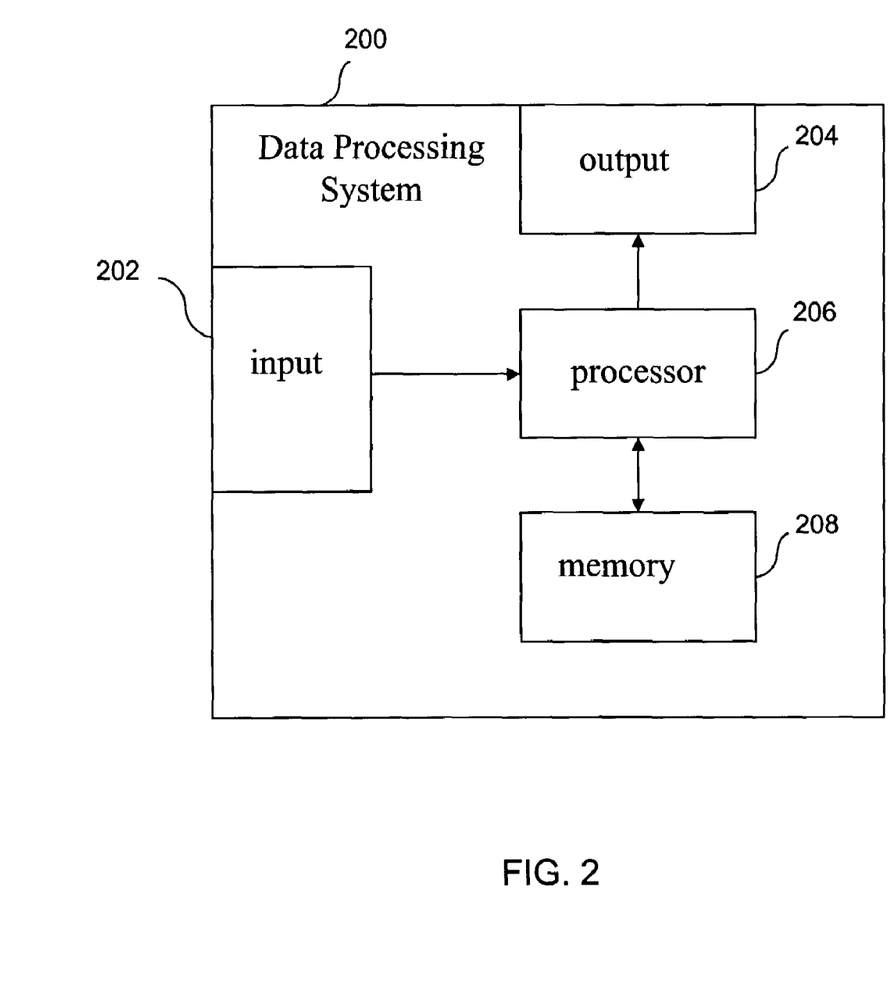
FIG. 2 is a block diagram of a computer system for use with the present invention.

A block diagram depicting the components of a computer system used in the present invention is provided in FIG. 2. The data processing system 200 comprises an input 202 for receiving a decision flowchart. Note that the input 202 may include multiple "ports" for receiving data and user input. Typically, user input is received from traditional input/output devices such as a mouse, trackball, keyboard, light pen, etc., but may also be received from other means such as voice or gesture recognition for example. An output 204 provides data to users or to other devices or programs; e.g., output to a user may be provided on a video display such as a computer screen, but may also be provided via printers or other means. The input 202 and the output 204 are both coupled with a processor 206, which may be a general-purpose computer processor or a specialized processor designed specifically for use with the present invention. The processor 206 is coupled with a memory 208 to permit storage of data and software to be manipulated by commands to the processor.

Figure 3:
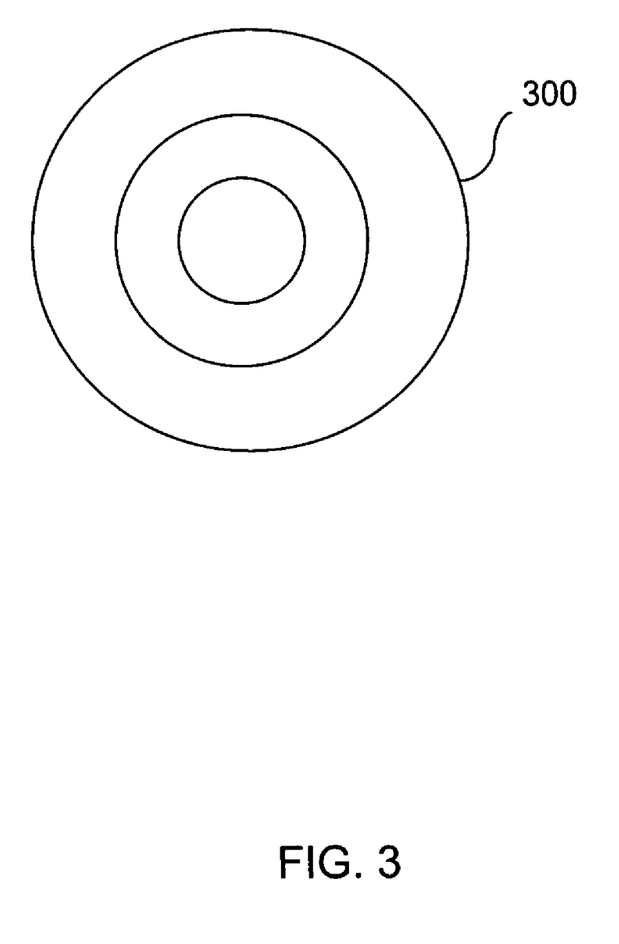
FIG. 3 is an illustrative diagram of a computer program product aspect of the present invention.

An illustrative diagram of a computer program product embodying the present invention is depicted in FIG. 3. The computer program product 300 is depicted as an optical disk such as a CD or DVD. However, as mentioned previously, the computer program product generally represents computer readable code stored on any compatible computer readable medium.

(4) Operational Details of the Present Invention

The present invention provides a tool for the automatic generation of graphical probabilistic models from existing decision flowcharts. Thus, the knowledge captured in a decision flowchart can be readily converted into a more powerful tool, allowing alteration of the decision process, and a graphical probabilistic model generated from it, in a simple and automatic manner, thus eliminating the need to re-start the modeling process from scratch. This conversion makes it possible to alleviate the shortcomings of flowcharts and to take advantage of the benefits of probabilistic models. The immediate benefits include flexibility of use in diagnosis, easy updating by learning, and the ability to cover cost of observations and multiple faults. This tool has application in any field where decisions are applied, non-limiting examples of which include diagnosing problems with machinery, such as cars, trucks, planes, boats, and trains, as well as with other problem types, such as computer network communications, satellite diagnostics, etc.

Figure 4:
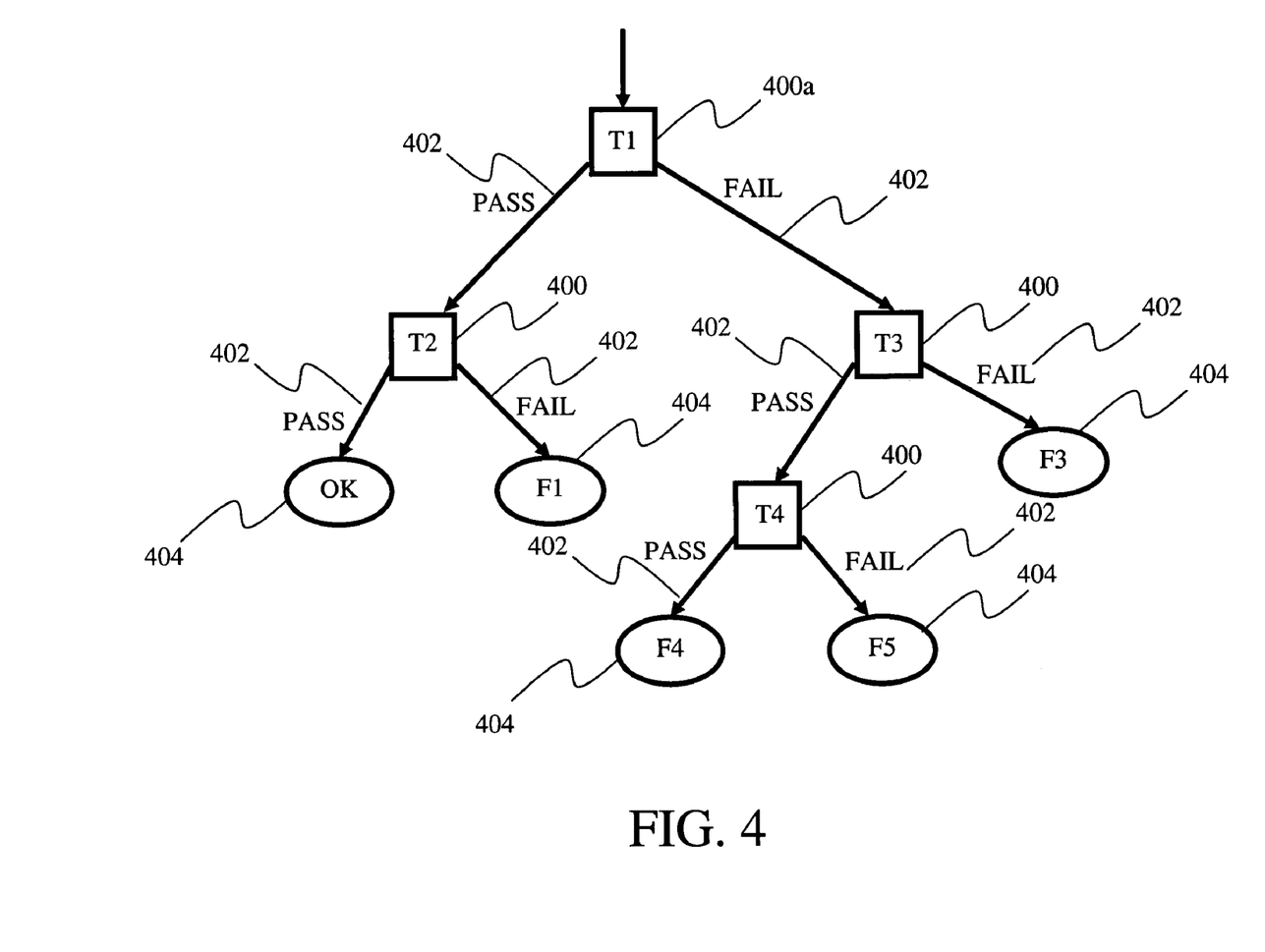
FIG. 4 is an illustration of an example decision flowchart.

A decision flowchart is a graph comprising nodes and branches, an example of which is shown in FIG. 4. The graph is typically in the form of a tree which, at its root 400a, has a single node representing an initial piece of evidence (typically an observation such as a symptom in a diagnostic problem). Branches, termed conclusion links 402, leaving the root evidence node 400a represent all possible outcomes of the observation. Each of the conclusion links 402 leads to the next node on the path. That node may be another evidence node 400 or it may be an outcome node 404. In the example decision flowchart, as depicted in FIG. 4, there are four evidence nodes 400 (including the root evidence node 400a), shown as squares and labeled T1, T2, T3, and T4. In addition, five outcome nodes 404 are shown as ovals with labels OK, F1, F3, F4, and F5. In a diagnostic application, the nodes F1, F3, F4, and F5 may represent failures, where OK represents a termination of a decision path that is not a failure. The "OK" can represent an "all is fine" condition (node) or a pointer to another flowchart, which continues diagnosis for that branch. Each of the evidence nodes 400 in FIG. 4 has two conclusion links 402, representing two possible outcomes: pass or fail.

The two outcome example is provided for illustration purposes only and the present invention is not limited to two outcomes per evidence node 400. Further, there is no limitation on the number of times the same evidence node 400 may occur in the flowchart, as long as it appears on different paths. However, the same outcome node 404 typically cannot appear at the end of two or more different paths. If the repeated outcome node 404 represents the same component or test, then each time it appears, it should represent a different failure mode of the component. In this case, each occurrence of the outcome node 404 would be labeled differently. The general steps for converting a flowchart into a graphical probabilistic model are illustrated next, using the flowchart from FIG. 4 as a non-limiting example.

Figure 5:
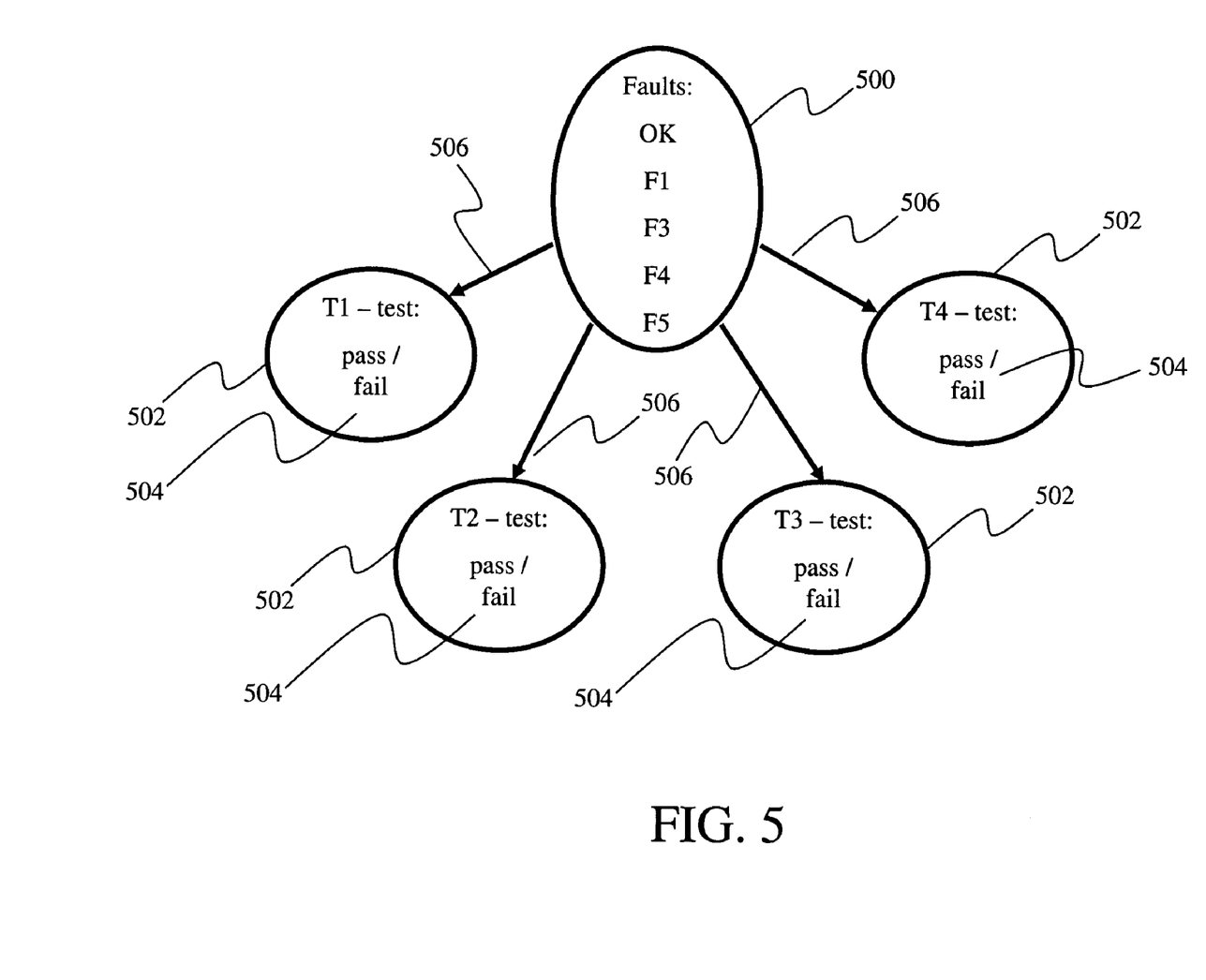
FIG. 5 is an illustration of an example probabilistic graph derived from the decision flowchart shown in FIG. 4.

First, each of the evidence nodes 400 and the outcome nodes 404 in the flowchart is labeled, with no repeating labels for identical outcome nodes 404. In the particular case shown, T1, T2, T3, and T4 are used as labels to represent tests to be performed to gather evidence, and OK, F1, F3, F4, and F5 are used as labels to indicate particular sources of failure (with OK, if no failure exists). Next, each conclusion link 402 of each evidence node 400 in the flowchart is labeled. In the case shown, the conclusion links 402 are labeled "PASS" or "FAIL." After the labeling has been completed, a graphical structure is created for the probabilistic graph, as depicted in FIG. 5. In this case, a naive Bayes network (BN) was used as the probabilistic model. An aggregate outcome node 500 is created in the Bayesian network, labeled "Faults." The aggregate outcome node 500 includes states that represent all of the outcome nodes 404 in the Bayesian network. For each of the evidence nodes 400 in the flowchart, a separate test node 502 is created in the Bayesian network. For each conclusion link 402 from an evidence node 400 in the flowchart, a separate test state 504 is created in the matching test node 502 of the Bayesian network. In the case shown, for simplicity, the name is generated using the label of the matching outcome, e.g., pass/fail. Causal links 506 are then created in the Bayesian network leading from the aggregate outcome node 500 to each test node 502.

After the Bayesian network structure has been created, prior probabilities are derived for the states of the aggregate outcome node 500 in the Bayesian network. The prior probabilities serve as the initial conditions, and may vary depending on the requirements of a particular implementation and the degree of pre-existing knowledge available. For purposes of this discussion, an equal likelihood of occurrence of each outcome state of the aggregate outcome node 500 is assumed. The prior probability for each outcome state is computed in this case by dividing one by the number of outcome states (e.g., for the situation in FIG. 5, the prior probability for each of the outcome states is ⅕=20%).

Figure 6:
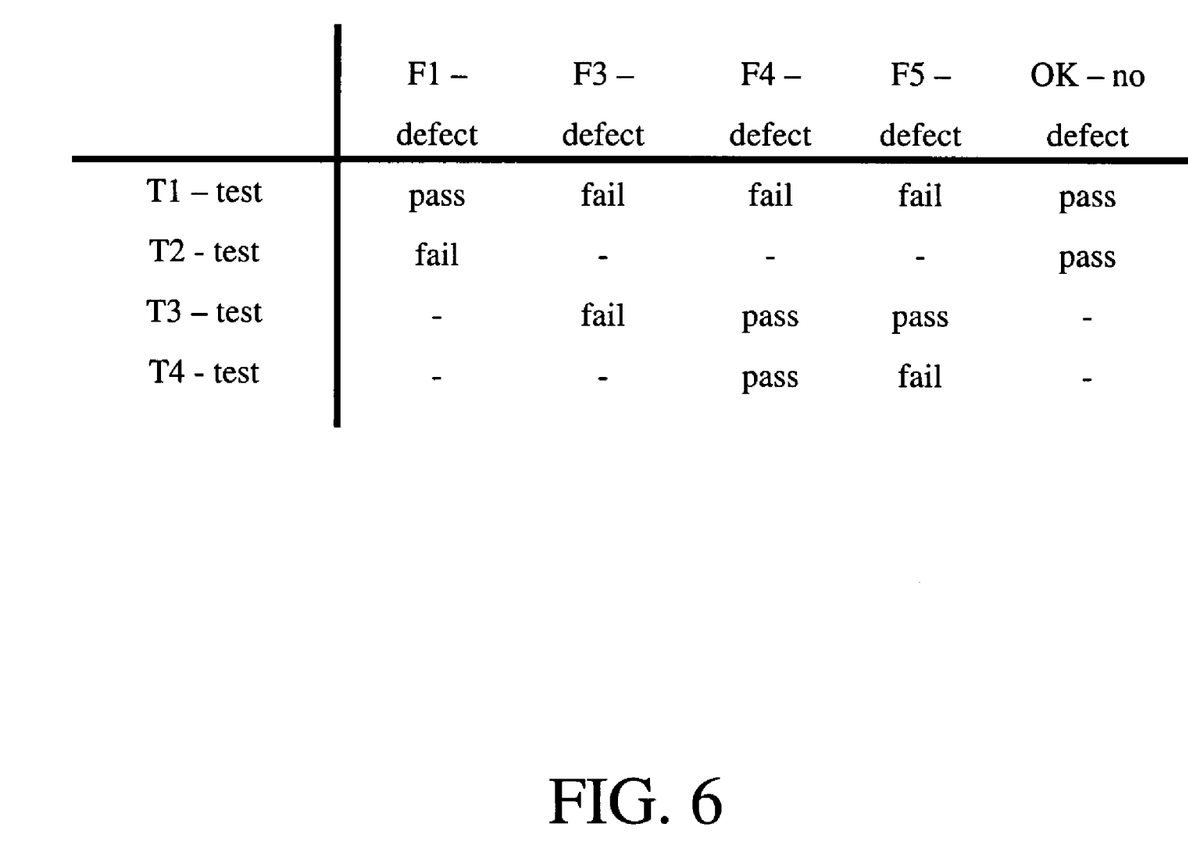
FIG. 6 is a causal dependency table derived from the decision flowchart shown in FIG. 4.

Next, conditional probabilities are derived for all test nodes 502 in the Bayesian network, given any of the outcome states in the aggregate outcome node 500. In this process, first a causal dependency table is created for the flowchart (a causal dependency table for the flowchart of FIG. 4 is shown in FIG. 6). The table captures the causal dependency of each outcome state on each piece of evidence, and has a separate column for each outcome node 404 in the flowchart and a separate row for each evidence node 400. The entries in the table represent outcomes of (conclusion links 402 extending from) evidence nodes 400. The entries in each column represent the combination that leads to the outcome state shown in the column header. For example, to arrive at a conclusion of an F1 defect, T1 must register "pass" and T2 must register "fail". Hyphens indicate an evidence node 400 that is not along the path from the root evidence node 400a to the outcome node 404. It may be observed that in the flowchart of FIG. 4, since T1 is the root node, T1 exists in all columns, since the test T1 is executed for all paths in the flowchart. Thus, the entries in the table are either conclusion links 402 of evidence nodes 400 or hyphens. As stated, each failure in the flowchart indicates the trace of a path from the conclusion node 404 to the root evidence node 400a. The path consists of the names of evidence nodes 400 and outcome nodes 404 (e.g., for the fault F5 in the flowchart of FIG. 4, the path is T4-Fail, T3-Pass, and T1-Fail). For each failure, the path information is entered into its column. In the rows for the evidence nodes 400 present on the path, the outcome or conclusion link 402 (e.g. pass or fail) is entered. In the remaining rows, a hyphen is entered.

Figure 7:
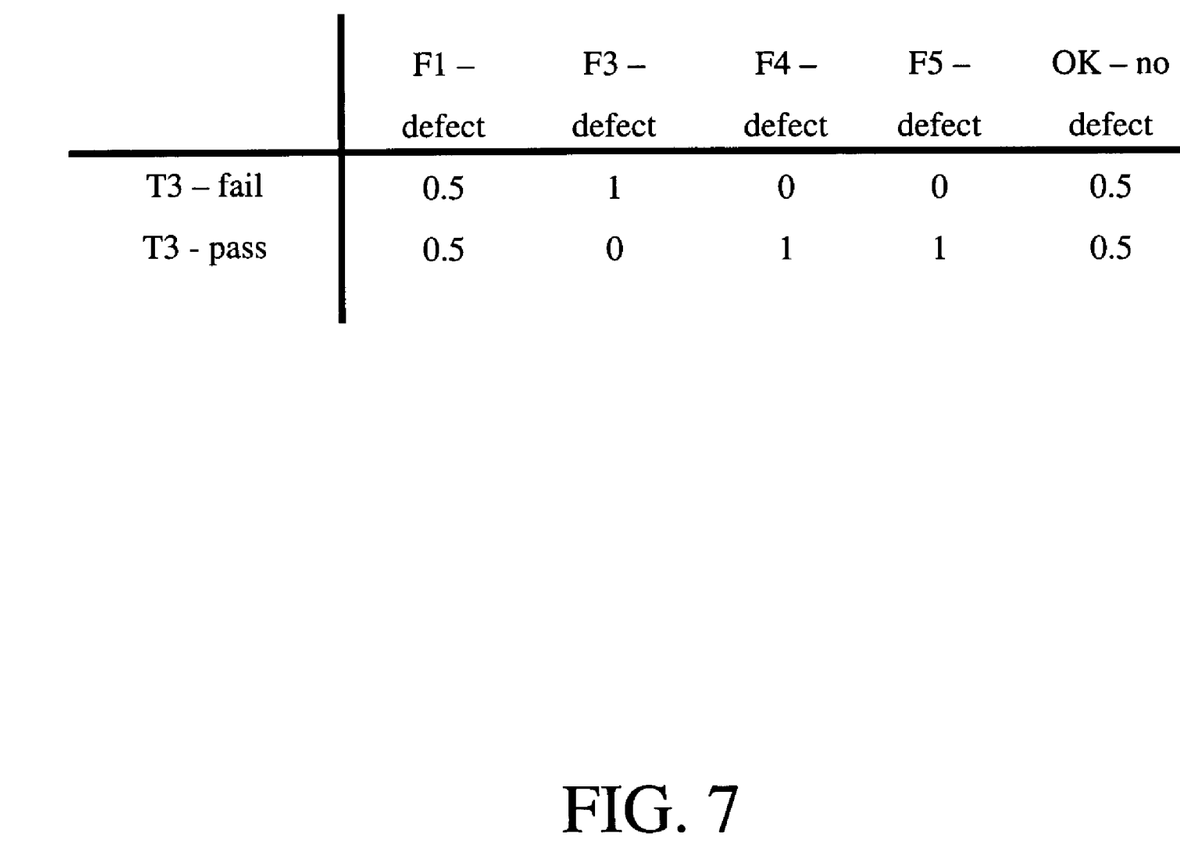
FIG. 7 is a conditional probability table derived from the decision flowchart shown in FIG. 4.

For each test node 502 in the Bayesian network, a conditional probability table is derived from the causal dependency table (shown in FIG. 6). An example of a conditional probability table is shown in FIG. 7. The conditional probability table contains conditional probabilities of an outcome state, given a particular test state 504 of a test node 502 (in this case, a failure). For example, in a diagnostic testing case, the conditional probabilities for a particular test, T3, given the particular defect FN are shown in the table. Since there is a hyphen in the column F1-defect, test T3 is considered independent of (unable to detect) defect F1. Since the flowchart shown in FIG. 4 is a binary tree with two conclusion links 402 extending from each evidence node 400, and since T3 is independent of F1, the chance of pass and the chance of fail are both 50%. In essence, the outcome of test T3 is a "don't care" value, and since F1 has no impact on the outcome of T3, it does not matter whether the outcome of T3 is pass or fail, and thus both are assigned an equal likelihood. If, for example, node T3 in FIG. 4 had three outcomes, and was a "don't care" value, then the conditional probability of each of the three outcomes (states) would be ⅓ (approximately 33%). Since an F3 defect causes a failure of test T3, the conditional probability of a failure of test T3 for failure F3 in FIG. 7 is shown as 1 (or 100%) for failure and 0 (0%) for pass. With regard to F4 and F5-type defects, T3 must be passed, thus, the conditional probability entries in these columns are 1 (or 100%) for pass and 0 (0%) for failure. Like outcome F1, outcome OK does not have an impact on T3. Thus, both pass and fail are assigned equal values of 0.5 (50%) in this column. Similar conditional probability tables are developed for each observation node (test TN).

Note that for a given piece of evidence and a given outcome, the conditional probabilities for all states must add up to 1 (100%). The conditional probability values will be equal to either 0 or 1 or 1 divided by the number of states (possible outcomes) of the observation. For each observation, a pertinent row in the causal dependency table is identified and translated into conditional probabilities one column at a time (i.e., the entry from the column for a given failure will be translated into a conditional probability of the observation given that particular feature). For each column with a hyphen in the causal dependency table, a value equal to one divided by the number of states for that observation is entered. Thus, the possible outcomes of a test unrelated to the failure in question are considered as "don't care" values with an equal likelihood of occurrence. For all other columns, the state in the conditional probability table that matches the outcome listed in the causal dependency table is identified, and the conditional probability for that state is set to 1 (100%), and the probability for remaining states are set to 0 (0%).

This procedure can be embedded into a software tool. The tool receives the flowchart and produces, as output, a model file for the Bayesian network. The Bayesian model used with an algorithmic engine produces decision sequences. The format of the Bayesian network file is dependent on the algorithmic engine. Examples of widely used Bayesian network engines include GeNIe (produced by Decision Systems Laboratory, University of Pittsburgh), Hugin (produced by Hugin, Inc., Niels Jemes Vej 10, 9220 Aalborg, Denmark), and Netica (produced by Norsys Software Corp., 2315 Dunbar Street, Vancouver, BC, Canada V6R 3N1). Some algorithmic engines are capable of translating model file formats of other engines. The procedure has been tested on an engine capable of producing ranked failures and ranked observations at each decision iteration. It ranks the failures using probability and observations using entropy calculations. The probabilistic model produced by the procedure described herein results in decision sequences of optimal convergence (i.e., a minimal number of tests being required to arrive at a root-cause).

The model produced by this procedure may also be enhanced using additional information. For example, costs of observations, if available, can be added directly to the model. If the actual likelihood of failures of components is known, the equal distribution of failures used in the procedure described above can be replaced by actual statistics. Such a model would produce decision sequences optimized not only for convergence, but also for cost and failure likelihood. The model produced by the procedure shown above is a single-fault model, and can be easily modified into a multiple-fault model if additional probability information is available.

What is claimed is:

1. A method for converting decision flowcharts into decision probabilistic graphs on a data processing system comprising steps of:
   receiving a representation of a decision flowchart having evidence nodes, a root evidence node, and outcome nodes, where the outcome nodes are related to the evidence nodes by conclusion links;
   generating a probabilistic graph based on the decision flowchart, including:
      an aggregate outcome node having a plurality of outcome states, with each outcome state representing an outcome node of the decision flowchart;
      a plurality of test nodes with each of the test nodes matching an evidence node in the decision flowchart, and each test state matching a conclusion link from the evidence node in the flowchart;
      causal links between the aggregate outcome node and the evidence nodes;
   calculating a set of prior probabilities for the outcome states; and
   determining conditional probabilities for all test states by examining dependencies of conclusion links on the outcome nodes in the decision flowchart.

2. A method for converting decision flowcharts into decision probabilistic graphs on a data processing system as set forth in claim 1, wherein the representation of the decision flowchart is obtained as a Flowchart Markup Language (FCML) document containing the essence of the decision flowchart.

3. A method for converting decision flowcharts into decision probabilistic graphs on a data processing system as set forth in claim 2, wherein the graphical representation of the decision flowchart is a Bayesian Network (BN).

4. A method for converting decision flowcharts into decision probabilistic graphs on a data processing system as set forth in claim 3, wherein in the step of calculating a set of conditional probabilities, a sub-step of generating a causal dependency table comprising a causal dependency of each test node on each outcome state is performed.

5. A method for converting decision flowcharts into decision probabilistic graphs on a data processing system as set forth in claim 4, wherein the causal dependency table includes a separate column for each outcome node of the decision flowchart and a separate row for each evidence node of the decision flowchart; whereby aggregate entries of each column of the table trace a path from the root evidence node to a particular outcome node.

6. A method for converting decision flowcharts into decision probabilistic graphs on a data processing system as set forth in claim 5, wherein the step of determining conditional probabilities further comprises a sub-step of:
   generating, for each evidence node, a conditional probability table comprising the conditional probability of each test state given each outcome state.

7. A method for converting decision flowcharts into decision probabilistic graphs on a data processing system as set forth in claim 6, further comprising a step of:
   generating a model file for the probabilistic graph to an algorithmic engine for further processing.

8. A method for converting decision flowcharts into decision probabilistic graphs on a data processing system as set forth in claim 7, wherein the predetermined likelihoods are inputted based on observed statistics.

9. A method for converting decision flowcharts into decision probabilistic graphs on a data processing system as set forth in claim 8, comprising a further step of determining a next piece of evidence to gather based on cost-of-evidence data.

10. A method for converting decision flowcharts into decision probabilistic graphs on a data processing system as set forth in claim 9, comprising a further step of generating a representation of the decision flowchart via graphing software for receipt in the receiving step.

11. A method for converting decision flowcharts into decision probabilistic graphs on a data processing system as set forth in claim 10, comprising a further step of generating a user interface to accept user input to the algorithmic engine whereby the user can control the order in which evidence is collected.

12. A method for converting decision flowcharts into decision probabilistic graphs on a data processing system as set forth in claim 11, further comprising a step of converting the graphical representation of the decision flowchart into a Bayesian network program-specific file.

13. A method for converting decision flowcharts into decision probabilistic graphs on a data processing system as set forth in claim 1, wherein the graphical representation of the decision flowchart is a Bayesian Network (BN).

14. A method for converting decision flowcharts into decision probabilistic graphs on a data processing system as set forth in claim 1, wherein in the step of calculating a set of conditional probabilities, a sub-step of generating a causal dependency table comprising a causal dependency of each test node on each outcome state is performed.

15. A method for converting decision flowcharts into decision probabilistic graphs on a data processing system as set forth in claim 14, wherein the causal dependency table includes a separate column for each outcome node of the decision flowchart and a separate row for each evidence node of the decision flowchart; whereby aggregate entries of each column of the table trace a path from the root evidence node to a particular outcome node.

16. A method for converting decision flowcharts into decision probabilistic graphs on a data processing system as set forth in claim 1, wherein the step of determining conditional probabilities further comprises a sub-step of:
generating, for each evidence node, a conditional probability table comprising the conditional probability of each test state given each outcome state.

17. A method for converting decision flowcharts into decision probabilistic graphs on a data processing system as set forth in claim 1, further comprising a step of:
generating a model file for the probabilistic graph to an algorithmic engine for further processing.

18. A method for converting decision flowcharts into decision probabilistic graphs on a data processing system as set forth in claim 1, wherein the predetermined likelihoods are inputted based on observed statistics.

19. A method for converting decision flowcharts into decision probabilistic graphs on a data processing system as set forth in claim 1, comprising a further step of determining a next piece of evidence to gather based on cost-of-evidence data.

20. A method for converting decision flowcharts into decision probabilistic graphs on a data processing system as set forth in claim 1, comprising a further step of generating a representation of the decision flowchart via graphing software for receipt in the receiving step.

21. A method for converting decision flowcharts into decision probabilistic graphs on a data processing system as set forth in claim 1, comprising a further step of generating a user interface to accept user input to the algorithmic engine whereby the user can control the order in which evidence is collected.

22. A method for converting decision flowcharts into decision probabilistic graphs on a data processing system as set forth in claim 1, further comprising a step of converting the graphical representation of the decision flowchart into a Bayesian network program-specific file.

23. A computer program product for converting decision flowcharts into decision probabilistic graphs, the computer program product comprising means, encoded in a computer-readable medium for:
receiving a representation of a decision flowchart having evidence nodes, a root evidence node, and outcome nodes, where the outcome nodes are related to the evidence nodes by conclusion links;
generating a probabilistic graph based on the decision flowchart, including:
an aggregate outcome node having a plurality of outcome states, with each outcome state representing an outcome node of the decision flowchart;
a plurality of test nodes with each of the test nodes matching an evidence node in the decision flowchart, and each test state matching a conclusion link from the evidence node in the flowchart;
causal links between the aggregate outcome node and the evidence nodes;
calculating a set of prior probabilities for the outcome states; and
determining conditional probabilities for all test states by examining dependencies of conclusion links on the outcome nodes in the decision flowchart.

24. A computer program product for converting decision flowcharts into decision probabilistic graphs on a data processing system as set forth in claim 23, wherein the representation of the decision flowchart is obtained as a Flowchart Markup Language (FCML) document containing the essence of the decision flowchart.

25. A computer program product for converting decision flowcharts into decision probabilistic graphs on a data processing system as set forth in claim 24, wherein the graphical representation of the decision flowchart is a Bayesian Network (BN).

26. A computer program product for converting decision flowcharts into decision probabilistic graphs on a data processing system as set forth in claim 25, wherein the means for calculating a set of conditional probabilities includes means for generating a causal dependency table comprising a causal dependency of each test node on each outcome state is performed.

27. A computer program product for converting decision flowcharts into decision probabilistic graphs on a data processing system as set forth in claim 26, wherein the causal dependency table includes a separate column for each outcome node of the decision flowchart and a separate row for each evidence node of the decision flowchart; whereby aggregate entries of each column of the table trace a path from the root evidence node to a particular outcome node.

28. A computer program product for converting decision flowcharts into decision probabilistic graphs on a data processing system as set forth in claim 27, wherein the means for determining conditional probabilities further includes means for:
generating, for each evidence node, a conditional probability table comprising the conditional probability of each test state given each outcome state.

29. A computer program product for converting decision flowcharts into decision probabilistic graphs on a data processing system as set forth in claim 28, further comprising means for:
generating a model file for the probabilistic graph to an algorithmic engine for further processing.

30. A computer program product for converting decision flowcharts into decision probabilistic graphs on a data processing system as set forth in claim 29, further comprising means for accepting predetermined likelihoods based on observed statistics.

31. A computer program product for converting decision flowcharts into decision probabilistic graphs on a data processing system as set forth in claim 30, further comprising means for determining a next piece of evidence to gather based on cost-of-evidence data.

32. A computer program product for converting decision flowcharts into decision probabilistic graphs on a data processing system as set forth in claim 31, further comprising means for generating a representation of the decision flowchart via graphing software for receipt by the means for receiving.

33. A computer program product for converting decision flowcharts into decision probabilistic graphs on a data processing system as set forth in claim 32, further comprising means for generating a user interface to accept user input to the algorithmic engine whereby the user can control the order in which evidence is collected.

34. A computer program product for converting decision flowcharts into decision probabilistic graphs on a data processing system as set forth in claim 33, further comprising means for converting the graphical representation of the decision flowchart into a Bayesian network program-specific file.

35. A computer program product for converting decision flowcharts into decision probabilistic graphs on a data processing system as set forth in claim 23, wherein the graphical representation of the decision flowchart is a Bayesian Network (BN).

36. A computer program product for converting decision flowcharts into decision probabilistic graphs on a data processing system as set forth in claim 23, wherein the means for calculating a set of conditional probabilities further includes means for generating a causal dependency table comprising a causal dependency of each test node on each outcome state is performed.

37. A computer program product for converting decision flowcharts into decision probabilistic graphs on a data processing system as set forth in claim 36, wherein the causal dependency table includes a separate column for each outcome node of the decision flowchart and a separate row for each evidence node of the decision flowchart; whereby aggregate entries of each column of the table trace a path from the root evidence node to a particular outcome node.

38. A computer program product for converting decision flowcharts into decision probabilistic graphs on a data processing system as set forth in claim 23, wherein the means for determining conditional probabilities further comprises means for:
generating, for each evidence node, a conditional probability table comprising the conditional probability of each test state given each outcome state.

39. A computer program product for converting decision flowcharts into decision probabilistic graphs on a data processing system as set forth in claim 23, further comprising means for:
generating a model file for the probabilistic graph to an algorithmic engine for further processing.

40. A computer program product for converting decision flowcharts into decision probabilistic graphs on a data processing system as set forth in claim 23, further comprising means for accepting predetermined likelihoods based on observed statistics.

41. A computer program product for converting decision flowcharts into decision probabilistic graphs on a data processing system as set forth in claim 23, further comprising means for determining a next piece of evidence to gather based on cost-of-evidence data.

42. A computer program product for converting decision flowcharts into decision probabilistic graphs on a data processing system as set forth in claim 23, further comprising means for generating a representation of the decision flowchart via graphing software for receipt by the means for receiving.

43. A computer program product for converting decision flowcharts into decision probabilistic graphs on a data processing system as set forth in claim 23, further comprising means for generating a user interface to accept user input to the algorithmic engine whereby the user can control the order in which evidence is collected.

44. A computer program product for converting decision flowcharts into decision probabilistic graphs on a data processing system as set forth in claim 23, further comprising means for converting the graphical representation of the decision flowchart into a Bayesian network program-specific file.

45. An apparatus for converting decision flowcharts into decision probabilistic graphs, the apparatus comprising a computer system including a processor, a memory coupled with the processor, an input coupled with the processor for receiving user input and data input, and an output coupled with the processor for outputting display data, wherein the computer system further comprises means, residing in its processor and memory, for:
receiving a representation of a decision flowchart having evidence nodes, a root evidence node, and outcome nodes, where the outcome nodes are related to the evidence nodes by conclusion links;
generating a probabilistic graph based on the decision flowchart, including:
an aggregate outcome node having a plurality of outcome states, with each outcome state representing an outcome node of the decision flowchart;
a plurality of test nodes with each of the test nodes matching an evidence node in the decision flowchart, and each test state matching a conclusion link from the evidence node in the flowchart;
causal links between the aggregate outcome node and the evidence nodes;
calculating a set of prior probabilities for the outcome states; and
determining conditional probabilities for all test states by examining dependencies of conclusion links on the outcome nodes in the decision flowchart.

46. An apparatus for converting decision flowcharts into decision probabilistic graphs on a data processing system as set forth in claim 45, wherein the representation of the decision flowchart is obtained as a Flowchart Markup Language (FCML) document containing the essence of the decision flowchart.

47. An apparatus for converting decision flowcharts into decision probabilistic graphs on a data processing system as set forth in claim 46, wherein the graphical representation of the decision flowchart is a Bayesian Network (BN).

48. An apparatus for converting decision flowcharts into decision probabilistic graphs on a data processing system as set forth in claim 47, wherein the means for calculating a set of conditional probabilities includes means for generating a causal dependency table comprising a causal dependency of each test node on each outcome state is performed.

49. An apparatus for converting decision flowcharts into decision probabilistic graphs on a data processing system as set forth in claim 48, wherein the causal dependency table includes a separate column for each outcome node of the decision flowchart and a separate row for each evidence node of the decision flowchart; whereby aggregate entries of each column of the table trace a path from the root evidence node to a particular outcome node.

50. An apparatus for converting decision flowcharts into decision probabilistic graphs on a data processing system as set forth in claim 49, wherein the means for determining conditional probabilities further includes means for:
generating, for each evidence node, a conditional probability table comprising the conditional probability of each test state given each outcome state.

51. An apparatus for converting decision flowcharts into decision probabilistic graphs on a data processing system as set forth in claim 50, further comprising means for:
generating a model file for the probabilistic graph to an algorithmic engine for further processing.

52. An apparatus for converting decision flowcharts into decision probabilistic graphs on a data processing system as set forth in claim 51, further comprising means for accepting predetermined likelihoods based on observed statistics.

53. An apparatus for converting decision flowcharts into decision probabilistic graphs on a data processing system as set forth in claim 52, further comprising means for determining a next piece of evidence to gather based on cost-of-evidence data.

54. An apparatus for converting decision flowcharts into decision probabilistic graphs on a data processing system as set forth in claim 53, further comprising means for generating a representation of the decision flowchart via graphing software for receipt by the means for receiving.

55. An apparatus for converting decision flowcharts into decision probabilistic graphs on a data processing system as set forth in claim 54, further comprising means for generating a user interface to accept user input to the algorithmic engine whereby the user can control the order in which evidence is collected.

56. An apparatus for converting decision flowcharts into decision probabilistic graphs on a data processing system as set forth in claim 55, further comprising means for converting the graphical representation of the decision flowchart into a Bayesian network program-specific file.

57. An apparatus for converting decision flowcharts into decision probabilistic graphs on a data processing system as set forth in claim 45, wherein the graphical representation of the decision flowchart is a Bayesian Network (BN).

58. An apparatus for converting decision flowcharts into decision probabilistic graphs on a data processing system as set forth in claim 45, wherein the means for calculating a set of conditional probabilities further includes means for generating a causal dependency table comprising a causal dependency of each test node on each outcome state is performed.

59. An apparatus for converting decision flowcharts into decision probabilistic graphs on a data processing system as set forth in claim 58, wherein the causal dependency table includes a separate column for each outcome node of the decision flowchart and a separate row for each evidence node of the decision flowchart; whereby aggregate entries of each column of the table trace a path from the root evidence node to a particular outcome node.

60. An apparatus for converting decision flowcharts into decision probabilistic graphs on a data processing system as set forth in claim 45, wherein the means for determining conditional probabilities further comprises means for:

generating, for each evidence node, a conditional probability table comprising the conditional probability of each test state given each outcome state.

61. An apparatus for converting decision flowcharts into decision probabilistic graphs on a data processing system as set forth in claim 45, further comprising means for:

generating a model file for the probabilistic graph to an algorithmic engine for further processing.

62. An apparatus for converting decision flowcharts into decision probabilistic graphs on a data processing system as set forth in claim 45, further comprising means for accepting predetermined likelihoods based on observed statistics.

63. An apparatus for converting decision flowcharts into decision probabilistic graphs on a data processing system as set forth in claim 45, further comprising means for determining a next piece of evidence to gather based on cost-of-evidence data.

64. An apparatus for converting decision flowcharts into decision probabilistic graphs on a data processing system as set forth in claim 45, further comprising means for generating a representation of the decision flowchart via graphing software for receipt by the means for receiving.

65. An apparatus for converting decision flowcharts into decision probabilistic graphs on a data processing system as set forth in claim 45, further comprising means for generating a user interface to accept user input to the algorithmic engine whereby the user can control the order in which evidence is collected.

66. An apparatus for converting decision flowcharts into decision probabilistic graphs on a data processing system as set forth in claim 45, further comprising means for converting the graphical representation of the decision flowchart into a Bayesian network program-specific file.

\* \* \* \* \*